United States Patent [19]

Meynckens et al.

[11] Patent Number: 5,961,371
[45] Date of Patent: Oct. 5, 1999

[54] CUTTING REFRACTORY MATERIAL

[75] Inventors: Jean-Pierre Meynckens, Villers-Perwin; Bernard Somerhausen, Nivelles, both of Belgium

[73] Assignee: Glaverbel, Brussels, Belgium

[21] Appl. No.: 08/983,336

[22] PCT Filed: Jun. 19, 1996

[86] PCT No.: PCT/BE96/00063

§ 371 Date: Dec. 29, 1997

§ 102(e) Date: Dec. 29, 1997

[87] PCT Pub. No.: WO97/01516

PCT Pub. Date: Jan. 16, 1997

[30] Foreign Application Priority Data

Jun. 28, 1995 [GB] United Kingdom ............... 9513126

[51] Int. Cl.$^6$ ........................................... B24C 5/04
[52] U.S. Cl. ............................... 451/38; 451/102
[58] Field of Search ..................... 451/38, 39, 40, 451/56

[56] References Cited

U.S. PATENT DOCUMENTS

| | | |
|---|---|---|
| 3,684,560 | 8/1972 | Brichard et al. . |
| 3,800,983 | 4/1974 | Brichard et al. . |
| 4,096,004 | 6/1978 | La Bate et al. . |
| 4,888,313 | 12/1989 | Adams et al. .......................... 501/103 |
| 5,013,499 | 5/1991 | Willard . |
| 5,024,711 | 6/1991 | Gasser et al. ............................ 451/38 |
| 5,069,004 | 12/1991 | Gillenwater ............................. 451/38 |
| 5,100,594 | 3/1992 | Zvosec et al. . |
| 5,202,090 | 4/1993 | Zvosec et al. . |
| 5,270,075 | 12/1993 | Robyn et al. . |
| 5,686,028 | 11/1997 | Meynckens et al. . |
| 5,733,174 | 3/1998 | Bingham et al. ......................... 451/39 |
| 5,800,246 | 9/1998 | Tomioka ................................. 451/38 |
| 5,876,267 | 3/1999 | Kanda .................................... 451/38 |

FOREIGN PATENT DOCUMENTS

| | | |
|---|---|---|
| 23973 | 3/1969 | Chile . |
| 2154228 | 9/1985 | United Kingdom . |
| 2213919 | 8/1989 | United Kingdom . |
| 2234502 | 2/1991 | United Kingdom . |
| 2237623 | 5/1991 | United Kingdom . |
| 2256864 | 12/1992 | United Kingdom . |
| 2256866 | 12/1992 | United Kingdom . |
| 2257136 | 1/1993 | United Kingdom . |
| 2269223 | 2/1994 | United Kingdom . |
| 2284415 | 6/1995 | United Kingdom . |

OTHER PUBLICATIONS

Oxide Ceramics, Physical Chemistry and Technology, by Eugene Ryshkewitch, Academic Press Inc., 111 Fifth Avenue, New York, NY and Academic Press Inc.)London) Ltd. 17 Old Queen Street, London S.W. 1, England. pp. 356–363. Dated: 00/00/60.

*Primary Examiner*—David A. Scherbel
*Assistant Examiner*—Daniel G. Shanley
*Attorney, Agent, or Firm*—Venable; George H. Spencer; Ashley J. Wells

[57] ABSTRACT

A method and powder mixture are described for cutting a refractory body. The powder mixture comprises refractory metal oxide particles and fuel particles which burn exothermically by combining with oxygen to form a refractory oxide. The mixture is characterised in that the refractory metal oxide of the powder mixture comprises calcium oxide and/or magnesium oxide. The powder mixture enables refractory bodies to be cut more effectively than hitherto.

17 Claims, No Drawings

CUTTING REFRACTORY MATERIAL

The present invention relates to a method of cutting a refractory body and in particular, but not exclusively, to a method of cutting a zirconia-containing refractory body. The invention also relates to a powder mixture for use in such a method.

Refractory structures of various types, such as metallurgical furnaces, coke ovens and glass melting furnaces tend to become damaged during the course of their working lives. Such damage may for example be manifest as slippage of one or more refractory blocks in relation to the main structure which results in an irregular surface profile, or as cracking of the refractory structure. It is in general desirable to re-establish the designed surface profile of the refractory structure, and it is also desirable to prevent further slippage of the block(s) in question and to fill any gap left by its or their displacement or cracking. In order to achieve these ends, it may be necessary or desirable to cut away any proud portion of the refractory structure. Alternatively, or in addition, it may be necessary or desirable to cut a keyway into a slipped block and/or a neighbouring block so that a key may be formed in or inserted into the keyway to prevent further slippage. Alternatively or in addition, it may be necessary or desirable to enlarge or shape any gap left by such slippage or cracking for the formation or insertion of a suitable plug. Such damage may alternatively be due to erosion of the material of the refractory structure. Such erosion tends to impart an irregular surface profile to the structure and it is often desirable to modify that surface profile before effecting a repair to the structure.

It may be necessary or desirable to form a hole in or otherwise cut a refractory structure for other purposes, for example to create openings in the wall of a furnace from outside the furnace.

The term "cutting" as used herein thus refers to removal of refractory material by means of a tool and encompasses the cutting away of a portion of the material, forming a hole or keyway in it, enlarging a hole or keyway, or creating an opening through it. The term includes "drilling", namely the formation of a rounded hole in the material.

A refractory structure can be cut mechanically, for example using a cutting wheel, drill or other edged tool, but this presents certain disadvantages for refractory repair. In order to cut the refractory and leave a surface suitable for repair, the operator would usually have to approach the cutting site quite closely, and this implies that that site would have to be at a temperature which the operator could tolerate for the time necessary to effect the cutting. This in turn implies that the refractory structure would have to be cooled from its normal operating temperature, or a temperature which is within its normal working cycle of operating temperatures. And it would have to be reheated after cutting and repair. In the case of industrial furnaces of various types, in order to avoid damage to the furnace as its refractory material contracts or expands, such cooling and reheating might have to be scheduled over a period of several days or even a few weeks, and this would accordingly represent a considerable loss in production from that furnace.

It has been proposed to repair refractory bodies by use of a "ceramic welding" technique. In this technique, the body is brought into contact, in the presence of oxygen, with a powder mixture comprising refractory metal oxide particles and fuel particles which burn in an exothermic manner by combining with oxygen to form a refractory oxide. The oxygen, usually alone, serves as a carrier gas to convey the powder mixture to the repair site. By this method a refractory mass is formed at the repair site. A particular advantage of such ceramic welding is that the repair can be effected while the refractory body is hot.

Thus, it is known from British patent specification GB 1 330 894 (Glaverbel) to form a refractory mass on a surface by projecting against the surface, at an elevated temperature and in the presence of oxygen, a powder mixture comprising refractory material particles and fuel particles which burn by combining with oxygen to form a refractory oxide. The fuel particles are particles whose composition and granulometry are such that they react in a highly exothermic manner with the oxygen while forming a refractory oxide and while releasing the necessary heat for melting, at least superficially, the projected refractory particles. In particular, adherent coatings consisting of silica, zirconia and alumina can be formed on the surface of a zirconia-containing refractory body by using a powder mixture comprising zircon, zirconia, and alumina as refractory material particles and a mixture of silicon and aluminium as fuel particles.

The present invention is concerned with aspects of the preparation stage which precedes a refractory repair operation. In its broadest sense the preparation stage is known as "dressing", namely making the refractory surface suitable for repair, and includes mere surface cleaning, smoothing or scraping as well as the more robust cutting and drilling activities required of the present invention. The use in refractory surface dressing of a method akin to ceramic welding has been envisaged, to benefit both from the highly exothermic reaction between the fuel particles and oxygen and from application to a refractory structure at or close to its working temperature.

In British patent specification GB 2 213 919-A (Glaverbel), it has been proposed to dress a refractory body by bringing the body into contact with a powder mixture comprising fuel particles, refractory oxide particles and a fluxing agent. In particular, a zirconia-containing refractory body may be dressed by contact with a powder mixture comprising silicon and aluminium as fuel particles, zirconia and alumina as refractory oxide particles and sodium carbonate as a fluxing agent. Other proposed fluxing agents include calcium carbonate when working with certain aluminosilicate refractories and magnesium carbonate when working with refractories other than those containing magnesia.

In U.S. Pat. No. 5,100,594 (Glaverbel and Fosbel Inc.), it has been proposed to repair a refractory body by a process wherein sufficient heat is generated, by oxidation of combustible particles projected against the body, for one of dressing the refractory body or forming a refractory weld mass thereon. Additional refractory particles are present in the projected powder when the process is used to form a weld mass on the surface to be repaired, e.g. a mass is formed by using zirconia and alumina on Corhart ZAC™, silica is used to fill fissures in silica blocks and magnesium oxide is used to form a coating on basic refractory blocks.

It is an object of the present invention to provide an improved method and an improved powder mixture for cutting refractory bodies.

According to a first aspect of the invention, there is provided a method of cutting a refractory body by projecting against a surface of the said body, in the presence of oxygen, a powder mixture comprising refractory metal oxide particles and fuel particles, which burn exothermically by combining with oxygen to form a refractory oxide, characterised in that the refractory metal oxide of the powder mixture comprises calcium oxide and/or magnesium oxide.

According to a second aspect of the invention, there is provided a powder mixture for cutting a refractory body, the powder mixture comprising refractory metal oxide particles and fuel particles which burn exothermically by combining with oxygen to form a refractory oxide, characterised in that the refractory metal oxide of the powder mixture comprises calcium oxide and/or magnesium oxide.

The fuel particles burn in an exothermic manner. The heat given out by this reaction causes the surface of the refractory body to melt. While not wishing to be bound by theory, we believe that the presence in the mixture of calcium oxide and/or magnesium oxide fluidises the molten material which enables its removal by flowing away from the surface being cut. This appears to rely on a chemical effect: the calcium oxide and/or magnesium oxide, being bases, react with acid phases which are to be found in the refractory material being treated.

The presence of calcium and/or magnesium oxides has the advantage of enabling a more rapid cutting of the refractory material at high temperatures and also enables one to more easily cut refractory materials at lower temperatures, such as for example an external face of a furnace in operation or even refractory materials at ambient temperature.

The powder mixture preferably contains both calcium oxide and magnesium oxide. The weight ratio of calcium oxide to magnesium oxide in the powder mixture is preferably between 5:1 and 0.4:1, most preferably between 2.5:1 and 0.75:1. A particularly useful source of a mixture of calcium and magnesium oxides is doloma, the product obtained by calcining the double carbonate dolomite, and having the approximate chemical formula $CaO.MgO$ with a Ca:Mg molar ratio of about 1:1, i.e. a weight ratio of approximately 1.39:1. The use of doloma is particularly advantageous in the treatment of glass furnace walls, because this material causes no pollution of the glass composition in the furnace since this composition usually, for instance in the case of soda-lime glass, already contains both calcium and magnesium oxides.

The carrier gas is preferably free of gaseous combustible substances. The fuel particles may be selected from particles of aluminium, magnesium, silicon, zirconium and mixtures thereof, in particular a mixture of aluminium and silicon.

The preferred composition, containing both calcium oxide and magnesium oxide, may additionally contain particles of further refractory material selected from alumina, silica, zirconia and mixtures thereof. However, it is most preferred that the powder mixture consists essentially of calcium oxide, magnesium oxide, aluminium and silicon.

The powder mixture may comprise from 70% to 90% by weight of refractory metal oxide particles, and from 10% to 30% by weight of fuel particles.

Preferably the particles of fuel in the powder mixture have an average dimension below 50 $\mu$m. "Average dimension", as used herein, designates a dimension such that 50% by weight of the particles have a smaller dimension than this average.

A useful technique for bringing the powder mixture into contact with the refractory body to be cut, is to project the powder mixtures against a surface of the refractory body to be cut, together with a carrier gas. In general it is recommended to perform the projection of particles in the presence of a high concentration of oxygen, for example, by using oxygen of commercial quality as a gas carrier. Because of the very high temperatures that the combustion of fuel particles can reach, it can penetrate impurities which might be present on the surface of the refractory body being treated, and it can soften or melt the surface. The presence of calcium oxide and/or magnesium oxide creates, with the material of the surface or the material adhering thereto, a liquid phase which is easily removed.

According to the invention the tool which effects the cutting is the means which delivers the powder mixture and oxygen to the cutting site. This means is conveniently a lance. A suitable lance comprises one or more outlets for the discharge of the powder stream, optionally together with one or more outlets for supplementary gas. When the process is carried out in a hot environment, the gas stream(s) may be discharged from a lance which is cooled by fluid circulating through it. Such cooling may easily be achieved by providing the lance with a water jacket.

In order to facilitate the formation of a regular jet of powder, the refractory particles preferably comprise substantially no particles with a size greater than 4 mm, most preferably not greater than 2.5 mm.

The refractory body to be cut may be a zirconia-containing refractory body forming part of a wall of a glass-making furnace, although the invention is equally applicable to any refractory body, whatever its application. In particular, the invention is useful for cutting or drilling holes in a silica-based refractory material, in alumina or in mullite and fireclay materials.

In forming holes in a given material using the process of the invention the required delivery rate of powder material to the material surface depends upon the temperature and the viscosity of the molten material which must run out of the hole. In general the required delivery rate is less than would be required to effect a ceramic weld repair and is typically in the range of about 10 to 30 kg/h.

The invention will now be described in more detail in the following non-limiting examples.

EXAMPLE 1

Two powder mixtures were prepared having the following compositions (% by weight)

| Ingredient | Average dimension ($\mu$m) | Example 1 | Example 1A |
|---|---|---|---|
| Zirconia# | 150 | 0 | 80% |
| Sintered doloma | 500 | 80% | 0% |
| Silicon | 5 | 14% | 14% |
| Aluminium | 6 | 6% | 6% |

The zirconia is stabilised zirconia containing about 4.5% of its weight of calcium oxide.

The silicon and aluminium fuel particles had a nominal maximum grain size below 45 $\mu$m.

These powders are well suited to use for forming holes in refractory materials. In this example, each of the powders was used to form a hole with a depth of 50 mm in (a) a zirconia containing refractory body formed of ZAC (Trade Mark) having an approximate composition of from 10–15% silica, from 40 to 55% alumina and from 30 to 45% zirconia, and (b) in a silica brick.

The mixture of particles dispersed in a carrier gas was projected at a rate of about 15 kg/h from a lance, with oxygen as carrier gas. The block was at a temperature of approximately 1300° C.

The time taken (in seconds) for the formation of the hole was measured with the following results:

| Refractory body | Example 1 | Example 1A |
| --- | --- | --- |
| ZAC | 50 | 95 |
| SiO$_2$ brick | 113 | 300 |

The experiment was repeated with the refractory bodies at ambient temperature. In this case it was not possible to form the hole in either refractory body with the composition of Example 1A, because a material of sufficient fluidity is not formed, whereas it was possible to form the hole in both refractory bodies with the powder mixture of Example 1.

EXAMPLE 2

The powder mixture of Example 1 was used to form a hole through a 50 mm thick block of mullite at a temperature of 1000° C. The mixture was again projected from a lance at a rate of about 15 kg/h with oxygen as carrier gas and took 90 seconds to penetrate right through the block.

We claim:

1. A method of cutting a refractory body by projecting against a surface of the said body, in the presence of oxygen, a powder mixture comprising refractory metal oxide particles and fuel particles which burn exothermically by combining with oxygen to form a refractory oxide, characterised in that the refractory metal oxide of the powder mixture comprises calcium oxide and/or magnesium oxide.

2. A method according to claim 1, which comprises both calcium oxide and magnesium oxide.

3. A method according to claim 2, wherein the weight ratio of calcium oxide to magnesium oxide is between 5:1 and 0.4:1, preferably between 2.5:1 and 0.75:1.

4. A method according to claim 3, wherein the powder mixture contains doloma.

5. A method according to claim 1, wherein the refractory body to be cut is at an elevated temperature.

6. A method according to claim 5, wherein the elevated temperature is above 600° C.

7. A method according to claim 1, wherein the refractory body to be cut comprises a zirconia-containing refractory body forming part of a wall of a glass-making furnace.

8. A powder mixture for cutting a refractory body, the powder mixture comprising refractory metal oxide particles and fuel particles which burn exothermically by combining with oxygen to form a refractory oxide, characterised in that the refractory metal oxide of the powder mixture comprises calcium oxide and/or magnesium oxide.

9. A powder mixture according to claim 8, which comprises both calcium oxide and magnesium oxide.

10. A powder mixture according to claim 9, wherein the weight ratio of calcium oxide to magnesium oxide is between 5:1 and 0.4:1, preferably between 2.5:1 and 0.75:1.

11. A powder mixture according to claim 10, wherein the powder mixture contains doloma.

12. A powder mixture according to claim 8, wherein the fuel particles are selected from particles of aluminium, magnesium, silicon, zirconium and mixtures thereof.

13. A powder mixture according to claim 12, wherein the fuel particles are constituted by a mixture of aluminium and silicon.

14. A powder mixture according to claim 8, wherein the powder mixture contains calcium oxide and magnesium oxide and additionally contains particles of further refractory material selected from alumina, silica, zirconia and mixtures thereof.

15. A powder mixture according to one of claim 8, wherein the powder mixture consists essentially of calcium oxide, magnesium oxide, aluminium and silicon.

16. A powder mixture according to claim 8, wherein the powder mixture comprises:

from 70% to 90% by weight of refractory metal oxide particles; and from 10% to 30% by weight of fuel particles.

17. A powder mixture according to claim 8, wherein the particles of fuel in the powder mixture have an average dimension below 50 μm.

\* \* \* \* \*